United States Patent
McCarthy-Howe

(10) Patent No.: US 12,032,987 B2
(45) Date of Patent: Jul. 9, 2024

(54) SYSTEM AND METHOD FOR PROXY-BASED COMMUNICATIONS FOR A PLURALITY OF MOBILE COMPUTING DEVICES

(71) Applicant: Strolid, Inc., Salem, NH (US)

(72) Inventor: Thomas Spencer McCarthy-Howe, Salem, NH (US)

(73) Assignee: Strolid, Inc., Salem, NH (US)

(*) Notice: Subject to any disclaimer, the term of this patent is extended or adjusted under 35 U.S.C. 154(b) by 0 days.

(21) Appl. No.: 17/724,486

(22) Filed: Apr. 19, 2022

(65) Prior Publication Data
US 2023/0333873 A1    Oct. 19, 2023

(51) Int. Cl.
*G06F 9/455* (2018.01)
*G06Q 30/02* (2023.01)

(52) U.S. Cl.
CPC ..... *G06F 9/45558* (2013.01); *G06Q 30/0281* (2013.01); *G06F 2009/45579* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | |
|---|---|---|
| 9,961,081 B2 | 5/2018 | Zayed |
| 10,013,388 B1 | 7/2018 | Wang |
| 2009/0036111 A1* | 2/2009 | Danford .............. H04L 41/0893 455/419 |
| 2016/0112875 A1* | 4/2016 | Kasravi ................. H04W 12/06 455/411 |
| 2019/0373058 A1* | 12/2019 | De Almeida Forjaz de Lacerda ............. H04L 67/1078 |
| 2020/0050469 A1 | 2/2020 | Zack |
| 2021/0289069 A1* | 9/2021 | Moshir .................. H04W 4/12 |

* cited by examiner

*Primary Examiner* — Lewis A Bullock, Jr.
*Assistant Examiner* — Melissa A Headly
(74) *Attorney, Agent, or Firm* — Marin Patents LLC; Gustavo Marin

(57) ABSTRACT

A virtual mobile computing device with enhanced availability, flexibility, statefulness, and persistence features that allows the virtual mobile computing device be used to facilitate communications and transactions even where the owner or the owner's physical mobile device are intermittently unavailable. The virtual mobile computing device is a containerized or virtual machine implementation of a mobile computing device tethered to a physical mobile device which allows for interactions to occur regardless of the network availability of the mobile device. In some embodiments, copies of, or links to functionality of, the virtual mobile computing device may be created to implement certain functionality, and may be passed from one entity in a transaction to another such entity. Depending on configuration, the virtual mobile computing device may reside on a server, or as hardware or firmware on the physical mobile computing device.

18 Claims, 11 Drawing Sheets

SYSTEM AND METHOD FOR PROXY-BASED COMMUNICATIONS FOR A PLURALITY OF MOBILE COMPUTING DEVICES

CROSS-REFERENCE TO RELATED APPLICATIONS

None.

BACKGROUND

Field of the Art

The disclosure relates to the field of computer technology, and more particularly to the field of virtualized computing devices.

Discussion of the State of the Art

Mobile computing devices (smartphones, tablet computers, etc.) have become a ubiquitous means for communications. It is now commonly expected that people will have mobile devices, that their mobile devices will be their primary form of communication, and that their mobile devices will be available for communication when needed. However, there are substantial drawbacks to the use of mobile devices as a primary form of communication.

While mobile computing devices do have tremendous advantages, reliance on physical as a primary communication platform has substantial disadvantages. Mobile devices are frequently changed as new devices become available and older devices become out of date. This leads to a persistence problem, as the old and new devices will have different identities, capabilities, operating systems, and other characteristics, and may be incompatible with or not recognized by certain systems. Mobile devices are not always available, so communications with a mobile device that is turned off or not connected to a network will fail. Businesses cannot install applications or daemons on the mobile phone to assist in communications or exchange or transfer of data, so mobile devices lack sufficient flexibility for many transactions. Mobile devices do not maintain awareness of the state of communications or interactions, particularly where transactions involve several parties, and so are insufficiently state aware. Multiple copies of a given physical phone cannot be made or exchanged to facilitate transactions, and so are insufficiently omnipresent to allow for transactions at inconsistent times or among parties who are not available on a regular basis.

What is needed is a virtual mobile computing device that fixes availability, flexibility, statefulness, and persistence problems communications inherent in using physical mobile devices such that the virtual mobile computing device can be used to facilitate communications and transactions even where the owner or the physical mobile device are intermittently unavailable.

SUMMARY

Accordingly, the inventor has conceived and reduced to practice, a virtual mobile computing device with enhanced availability, flexibility, statefulness, and persistence features that allows the virtual mobile computing device be used to facilitate communications and transactions even where the owner or the owner's physical mobile device are intermittently unavailable. The virtual mobile computing device is a containerized or virtual machine implementation of a mobile computing device tethered to a physical mobile device which allows for interactions to occur regardless of the network availability of the mobile device. In some embodiments, copies of, or links to functionality of, the virtual mobile computing device may be created to implement certain functionality. In some embodiments, the virtual mobile computing device may reside on a server, while in other embodiments, it may reside as hardware or firmware on the physical mobile computing device. In some embodiments, the virtual mobile computing device may be passed from one entity in an communication or transaction chain to another entity in the chain to facilitate interactions necessary for the communication or transaction.

According to a preferred embodiment, a virtual mobile computing device is disclosed, comprising: a set of operating system libraries and dependencies configured to allow the virtual mobile computing device to be installed on a host computer and to operate as an executable package on the host operating system with access to a memory and a processor of the host operating system; a mobile phone emulator comprising a first plurality of programming instructions which, when stored in the memory and operating on the processor, emulate the operation of a physical mobile computing device, wherein: the emulation includes a network connection via the host computer; and the mobile phone emulator is connected to the physical mobile computing device that it emulates via the emulated network connection; a state manager comprising a second plurality of programming instructions which, when stored in the memory and operating on the processor, causes the virtual mobile computing device to: store a state of a transaction, the transaction having the transaction identifier; receive a notification of a change in the state of the transaction; and update the state of the transaction to reflect the detected change; a journey tracker comprising a third plurality of programming instructions which, when stored in the memory and operating on the processor, causes the virtual mobile computing device to: receive, via the mobile phone emulator, a communication associated with the transaction, the communication comprising a transaction identifier, a source of the communication, and a destination of the communication, and the change in the state of the transaction; store the source and destination in a journey log associated with the transaction; send the communication to a communication manager; send the notification of the change in the state of the transaction to the state manager; and transmit the communication to the destination via the mobile phone emulator; a communication manager comprising a fourth plurality of programming instructions which, when stored in the memory and operating on the processor, causes the virtual mobile computing device to: receive the communication from the journey tracker; and store the communication in a communication log associated with the transaction.

According to another preferred embodiment, a method for using virtual mobile computing device to facilitate transactions is disclosed, comprising the steps of: installing a virtual mobile computing device on a host computer, the virtual mobile computing device comprising: a set of operating system libraries and dependencies configured to allow the virtual mobile computing device to operate as an executable package on the host operating system with access to a memory and a processor of the host operating system; a mobile phone emulator comprising a first plurality of programming instructions which, when stored in the memory and operating on the processor, emulate the operation of a physical mobile computing device, wherein: the emulation includes a network connection via the host computer; and the mobile phone emulator is connected to the physical mobile computing device that it emulates via the emulated network connection; a state manager comprising a second plurality of programming instructions stored in the memory and operable on the processor; a journey tracker comprising a third plurality of programming instructions stored in the memory and operable on the processor; and a communication manager comprising a fourth plurality of programming instructions stored in the memory and operable on the processor; using the state manager to: store a state of a transaction, the transaction having the transaction identifier; receive a notification of a change in the state of the transaction; and update the state of the transaction to reflect the detected change; using the journey tracker to: receive, via the mobile phone emulator, a communication associated with the transaction, the communication comprising a transaction identifier, a source of the communication, and a destination of the communication, and the change in the state of the transaction; store the source and destination in a journey log associated with the transaction; send the communication to a communication manager; send the notification of the change in the state of the transaction to the state manager; and transmit the communication to the destination via the mobile phone emulator; using the communication manager to: receive the communication from the journey tracker; and store the communication in a communication log associated with the transaction.

According to an aspect of an embodiment, the state manager further stores a state of the virtual mobile computing device, and wherein the change in the state of the transaction is a change in the state of the physical mobile computing device.

According to an aspect of an embodiment, the change in the state of the physical mobile computing device is a change in location of the physical mobile computing device.

According to an aspect of an embodiment, the change in the state of the physical mobile computing device is an operation of the physical mobile computing device comprising an approval of the transaction.

According to an aspect of an embodiment, the device further comprises an application layer comprising a fifth plurality of programming instructions which, when stored in the memory and operating on the processor, causes the virtual mobile computing device to: receive an application from an entity involved in the transaction, the application comprising a sixth plurality of programming instructions; install the application; and operate in part in accordance with the sixth plurality of programming instructions.

According to an aspect of an embodiment, the sixth plurality of programming instructions, when stored in the memory and operating on the processor, causes the virtual mobile computing device to: monitor the state of the virtual mobile computing application; and transmit notification of the state to the entity.

According to an aspect of an embodiment, the mobile phone emulator further comprises contact information for an owner of the physical mobile computing device to which the mobile phone emulator is connected.

According to an aspect of an embodiment, the change in state causes the contact information for the owner of the physical mobile computing device to be sent to an entity involved in the transaction.

According to an aspect of an embodiment, the virtual mobile computing device is integrated into a customer relationship management system and is used to track interactions between an owner of the physical mobile computing device and a business.

According to an aspect of an embodiment, the transaction is one of the tracked interactions between the owner of the physical mobile computing device and the business.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
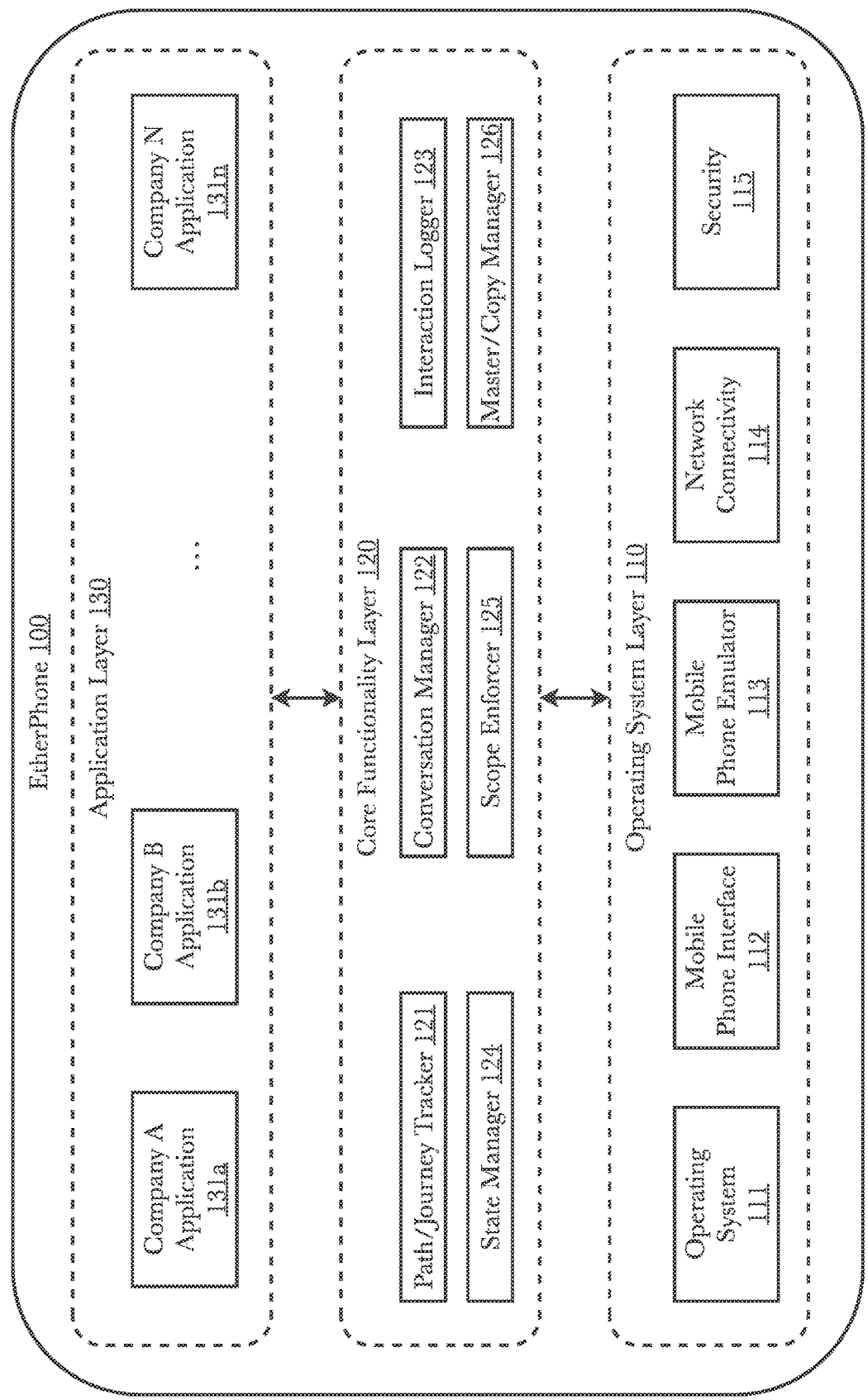
FIG. 1 is a block diagram illustrating an exemplary system architecture for a virtual mobile computing device.

The inventor has conceived, and reduced to practice, a virtual mobile computing device with enhanced availability, flexibility, statefulness, and persistence features that allows the virtual mobile computing device be used to facilitate communications and transactions even where the owner or the owner's physical mobile device are intermittently unavailable. The virtual mobile computing device is a containerized or virtual machine implementation of a mobile computing device tethered to a physical mobile device which allows for interactions to occur regardless of the network availability of the mobile device. In some embodiments, copies of, or links to functionality of, the virtual mobile computing device may be created to implement certain functionality. In some embodiments, the virtual mobile computing device may reside on a server, while in other embodiments, it may reside as hardware or firmware on the physical mobile computing device. In some embodiments, the virtual mobile computing device may be passed from one entity in an communication or transaction chain to another entity in the chain to facilitate interactions necessary for the communication or transaction.

Mobile computing devices (smartphones, tablet computers, etc.) have become a ubiquitous means for communications, so much so that the mobile device itself often acts as a proxy for the owner of the device. The mobile device identifier is often associated with photos, avatars, or personas of the owner in the computing devices of others, the location of the mobile device is often assumed to be the location of the owner, and interactions with or through the mobile phone (e.g., communications, approvals, etc., even where not confirmed by security protocols such as passwords, digital signatures, etc.) are assumed to be interactions with the owner. It is now commonly expected that people will have mobile devices, that their mobile devices will be their primary form of communication, and that their mobile devices will be available for communication when needed.

While the idea that a physical mobile device can be used as a proxy for the device's owner has advantages, there are drawbacks to reliance on physical mobile devices proxies for their owners. The core problems with using physical mobile devices as proxies for their owners are that such devices are not persistent, stateful, flexible, and omnipresent. Mobile phones are a passive tool for their owners and users, and not active participants in facilitation of communications and transactions. While mobile phones may be perceived as proxies by other humans involved in a communication or transaction, they are really just communication channels through which the entities operating the mobile devices manually engage in conversations and transactions. If mobile phones are to act as proxies for their users and to become active (or at least automated) tools for facilitation of communications and transactions, these drawbacks must be overcome.

Regarding persistence, when the mobile device is unavailable, the device cannot be accessed and cannot be used for communications or transactions. Mobile devices are not always available, so communications with a mobile device that is turned off or not connected to a network will fail. This means that any communications or transactions relying on the mobile device will be suspended, delayed, or canceled, which is a substantial hindrance to communications and transactions involving several entities or entities that themselves are not available at all times.

Regarding statefulness, mobile devices do not maintain awareness of the state of communications or interactions, particularly where transactions involve several parties, and so are insufficiently state aware. This means that complex transactions involving multiple entities, documents, approvals/signatures, etc., must be manually facilitated, either by the mobile device owner (e.g., sending emails to initiate each subsequent stage of the transaction) or by another entity involved in the transaction (e.g., an escrow company which sends emails to initiate each subsequent stage of the transaction).

Regarding flexibility, businesses cannot install applications or daemons on a physical mobile phone to assist in communications or exchange or transfer of data, so mobile devices lack sufficient flexibility for many transactions. The owner or user of a mobile phone can manually install applications written by a business which provide functionality, but a business cannot itself install applications or daemons it needs to facilitate communications or transactions, particularly in transactions involving chains or webs of interactions between multiple entities. The virtual mobile computing device described herein allows businesses to install such applications and daemons such that transactions involving the owner of the mobile phone can be automated by automating interactions such as collection and transmission of data; collection, integration, and forwarding, of approvals; verification of identities and authorizations; tracking of the state of transactions; and notifications to parties involved.

Regarding omnipresence, multiple copies of a given physical phone cannot be made or exchanged to facilitate transactions, and so are insufficiently omnipresent to allow for transactions at inconsistent times or among parties who are not available on a regular basis. Depending on the implementation and configuration, the virtual mobile computing device described herein is either always available from a networked server or exists in multiple copies distributed to entities involved in a transaction, such that it is always available no matter when an interaction associated with a transaction occurs. Every entity involved in a communication or transaction always has access to the virtual mobile computing device, so interactions can occur between parties even when the parties themselves or their physical mobile devices are not available. This functionality greatly enhanced transactions where certain parties are intermittently available or where parties to a transaction are available at different times (for example, when they are located in different time zones).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 2:
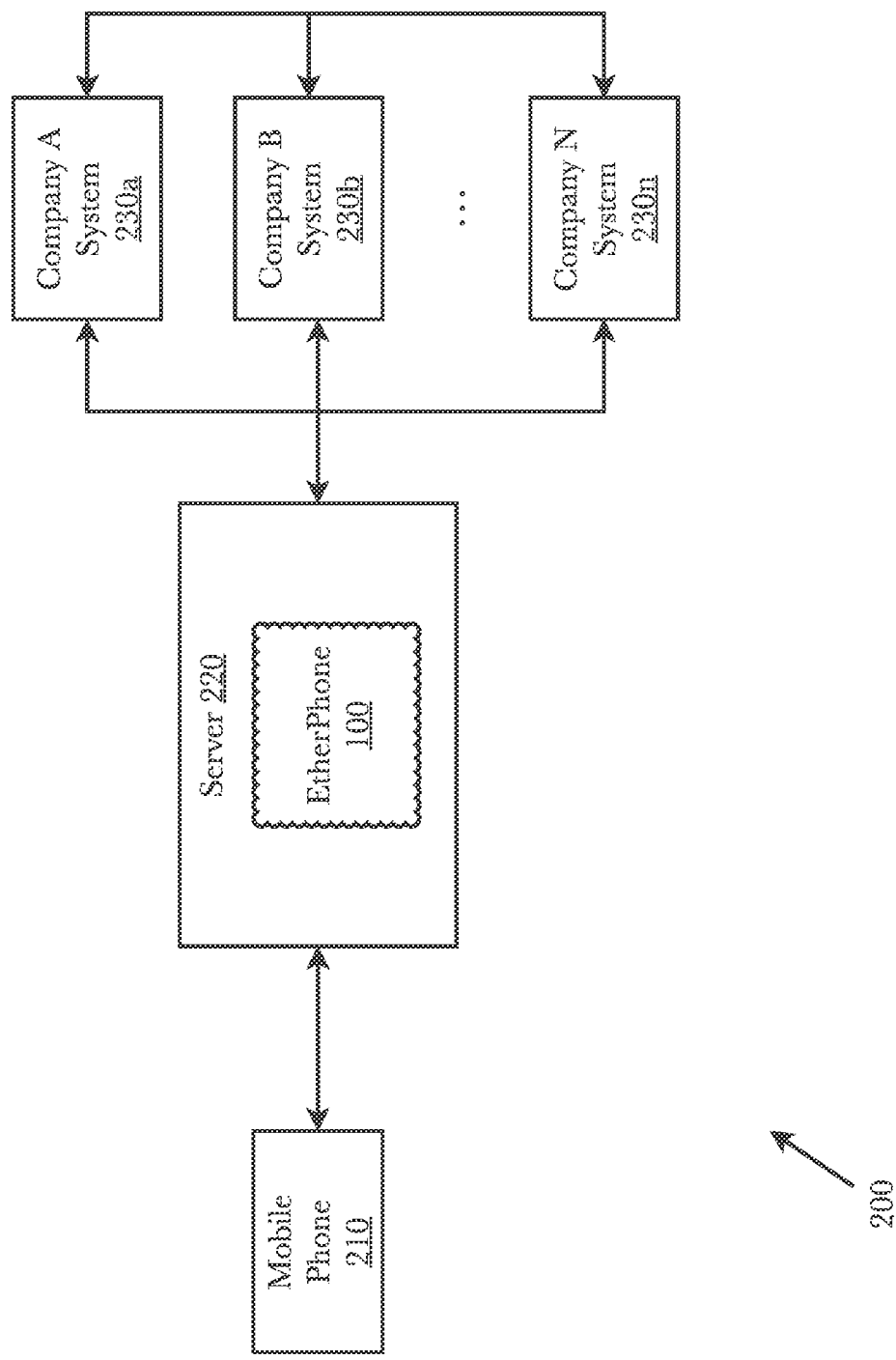
FIG. 2 is a block diagram illustrating an exemplary implementation of a virtual mobile computing device wherein the device resides on a server.

FIG. 1 is a block diagram illustrating an exemplary system architecture for a virtual mobile computing device. The virtual mobile computing device (hereinafter referred to as a "etherPhone") 100 is a containerized or virtual machine construct which, in part, emulates the functionality of a physical mobile computing device (hereinafter referred to, without limiting its scope, as a mobile phone, as shown in FIG. 2, reference 210). However, it is important to note that the etherPhone 100 is not simply an emulation of a mobile phone. The emulation of a mobile phone is only a portion of the functionality of the etherPhone 100. The etherPhone 100 of this embodiment comprises three layers of functionality: an operating system layer 110 which provides the necessary system functionality (e.g., operating system kernel), network connectivity, security, etc., the core functionality layer 120 which provides the core functions of the etherPhone 100 such as journey tracking, state management, conversation management, etc., and the application layer 130 which allows for businesses to install applications and daemons for facilitation of communications and transactions with the owner of the physical mobile phone 210 and other entities who may be involved.

The operating system layer 110 provides the necessary system functionality for the etherPhone 100 and comprises an operating system 111, a mobile phone interface 112, a mobile phone emulator 113, network connectivity functions 114, and security features 115.

The operating system 110 may be a full operating system (e.g., in the case of implementation as a virtual machine) or may contain just the operating system libraries and dependencies required to run the code of the etherPhone 100 as a lightweight executable on any computing infrastructure (e.g., in the case of implementation as a container). In many cases, containerization will be a preferred implementation as it provides a portable executable package that is abstracted away from the host operating system and thus can be run on any host computing platform. The mobile phone interface 112 tethers the etherPhone 100 to the mobile phone 210 with which it is associated such that changes to either the etherPhone 100 or the mobile phone 210 are mirrored in the other device and communications may be passed through bidirectionally whenever there is a connection to the mobile phone 210. The mobile phone interface 112 is ideally connected to the mobile phone 210 whenever it is available, and may periodically attempt to re-establish connections to the mobile phone 210 when a connection is not detected. Transactions and communications that occur with or on the etherPhone 100 while it is not connected to the mobile phone 210 are recorded and updated to the mobile phone 210 when a connection is re-established. The mobile phone emulator 113 allows the etherPhone to emulate the functionality of the mobile phone 210 such that people and systems interacting with the etherPhone 100 may interact with the etherPhone 100 as if they were interacting with the mobile phone 210 itself. The mobile phone emulator 113 allows the etherPhone to act as a proxy for the mobile phone 210 and thus, as a proxy for the owner of the mobile phone 210. The network connectivity 114 may be provided using any available networking protocol (e.g., TCP/IP, WiFi, Bluetooth, GSM, CDMA, etc.). The security module 115 provides security functions normally available on mobile computing devices such as encryption, password protection, firewalls, etc.

The core functionality layer 120 provides the functionality that allows the etherPhone 100 to facilitate communications and transactions, and comprises a path/journey tracker 121, a conversation manager 122, an interaction logger 123, a state manager 124, a scope enforcer 125, and a master/copy manager 126.

The path/journey tracker 121 tracks the path (often called in a "customer journey" in the customer relationship management field) of a communication, interaction, or transaction. For example, in a case where a customer submits a product query on a company's website, the query may first be received by a receptionist or clerk, and passed on to a sales representative. The sales representative may call the owner on the phone and be asked a technical question. The technical question may be forwarded by the sales representative by email to a product engineer who provides a response to the sales representative, after which the sales person forwards the response by email to the owner. Using an etherPhone, this transaction path or journey can be captured by the path/journey tracker 121 via a series of notifications and logging. This tracking can be done in a number of ways, depending on the system configuration. Some examples of different configurations follow. A copy of the etherPhone may be sent with the customer's product query to the company, which transfers the copy of the etherPhone around with the various communications, logging each step of the journey. A copy of the etherPhone may be uploaded to the company's customer relationship management (CRM) system at the time of the customer's product query, and the CRM system may notify the etherPhone of steps along the journey. The etherPhone may be located on a server in the cloud, and a link to the etherPhone may be sent to the customer's CRM system for the CRM system to send notifications regarding the steps in the journey. Other configurations are possible.

The conversation manager 122 tracks conversations in the same way as the path/journey tracker 121 tracks steps in a customer journey. For each conversation, logs are kept of each dates, times, people, and locations involved, such that a complete record of each conversation (and cross-references to related conversations, branches, or threads) is kept as part of the eitherPhone's records. Depending on settings of the conversation manager 122, conversations may be kept permanently, or may be deleted after a certain time has expired or after certain triggers occur (such as the completion of a transaction). The conversation manager 122 may further log the step of the path or journey at which each conversation element (e.g., queries, responses, statements, etc.) occurs such that conversations can be cross-referenced with the path or journey.

The interaction logger 123 tracks interactions between people and/or systems in the same way as the path/journey tracker 121 tracks steps in a customer journey. Interactions logged by the interaction logger 123 include interactions necessary for transactions to be completed such as requests for approval, approvals, forwarding and receipt of documents, form completions, etc.

The state manager 124 tracks the state of the etherPhone (e.g., active communications/transactions, what is needed for the next step of a transaction, whether it is connected to the mobile phone, etc.), the state of its associated mobile phone 210 (e.g., its location, connectivity status, etc.), the states of any required interactions (e.g., approvals, etc.), the states of any contacts (i.e., contact information of people, their current statuses, availabilities, etc.).

The scope enforcer 125 provides additional data security and reduces required storage space and bandwidth by enforcing limits on the scope of communications and transactions. For example, a customer may be seeking bids from several contractors to complete a certain home renovation project. The scope enforcer may be configured such that conversations and transactions with a given contractor are restricted from containing information associated with any conversation or transaction of another contractor. This would prevent accidental forwarding of a contractor's bid by email to one of its competitors, and similar accidental data breaches.

The master/copy manager 126 is responsible for tracking all copies of the etherPhone and integrating all information from each copy to a master etherPhone, such that the master etherPhone contains a complete record of all conversations and transactions occurring through each copy of the etherPhone. In some configurations, the master/copy manager 126 may be configured to provide bidirectional synchronization of the master and all copies, such that all instances (both master and copies) of the etherPhone have synchronized information. For example, copies of the etherPhone may be distributed to multiple parties involved of a given transaction. Each party may interact with its copy of the etherPhone separately, with each copy sending its information via its own master/copy manager 126 to the master/copy manager 126 of the master copy for coordination. This allows for each party involved to interact with a copy of the etherPhone "offline" and have those interactions synchronized when connectivity is re-established.

The application layer 130 allows parties involved in a transaction to install applications or helper daemons on the etherPhone 100 to facilitate transactions. Here, several applications from different companies 131*a-n* are shown as having been installed on the etherPhone. Some examples of applications and daemons follow. The Company A application 131*a* could be a helper daemon that notifies Company A whenever a call is made via the mobile phone 210 to Company A's customer support number. The Company B application 131*b* could be an application that displays a product advertisement, entry code screen for unlocking a door, or other useful information or tool on the mobile phone when the mobile phone is at certain geographic locations. The Company N application 131*n* could be an escrow helper application that detects signature of an escrow document and initiates the next step of the escrow process (e.g., contacting a bank on behalf of a real estate buyer for a home loan). Any number of such applications and/or daemons may be installed on the etherPhone to provide additional functionality.

FIG. 2 is a block diagram 200 illustrating an exemplary implementation of a virtual mobile computing device wherein the device resides on a server. In this embodiment, the etherPhone 100 resides on a network-connected server 220 and is tethered to its associated mobile phone 210 via a network connection. Links to the etherPhone are sent to one of several companies involved in a transaction 230*a-n*, along with a transaction identification (ID) number. As transactions occur at each of the companies 230*a-n* employees involved in the transaction at each company may update the status of the transaction via the links. The process may be partially automated by including an email address for the etherPhone in communications or including a phone number for the etherPhone in text messaging. The process may be fully automated if systems at each company are adopted that are etherPhone-compatible. Any communications directly with the mobile phone 210 are automatically logged to the etherPhone.

Figure 3:
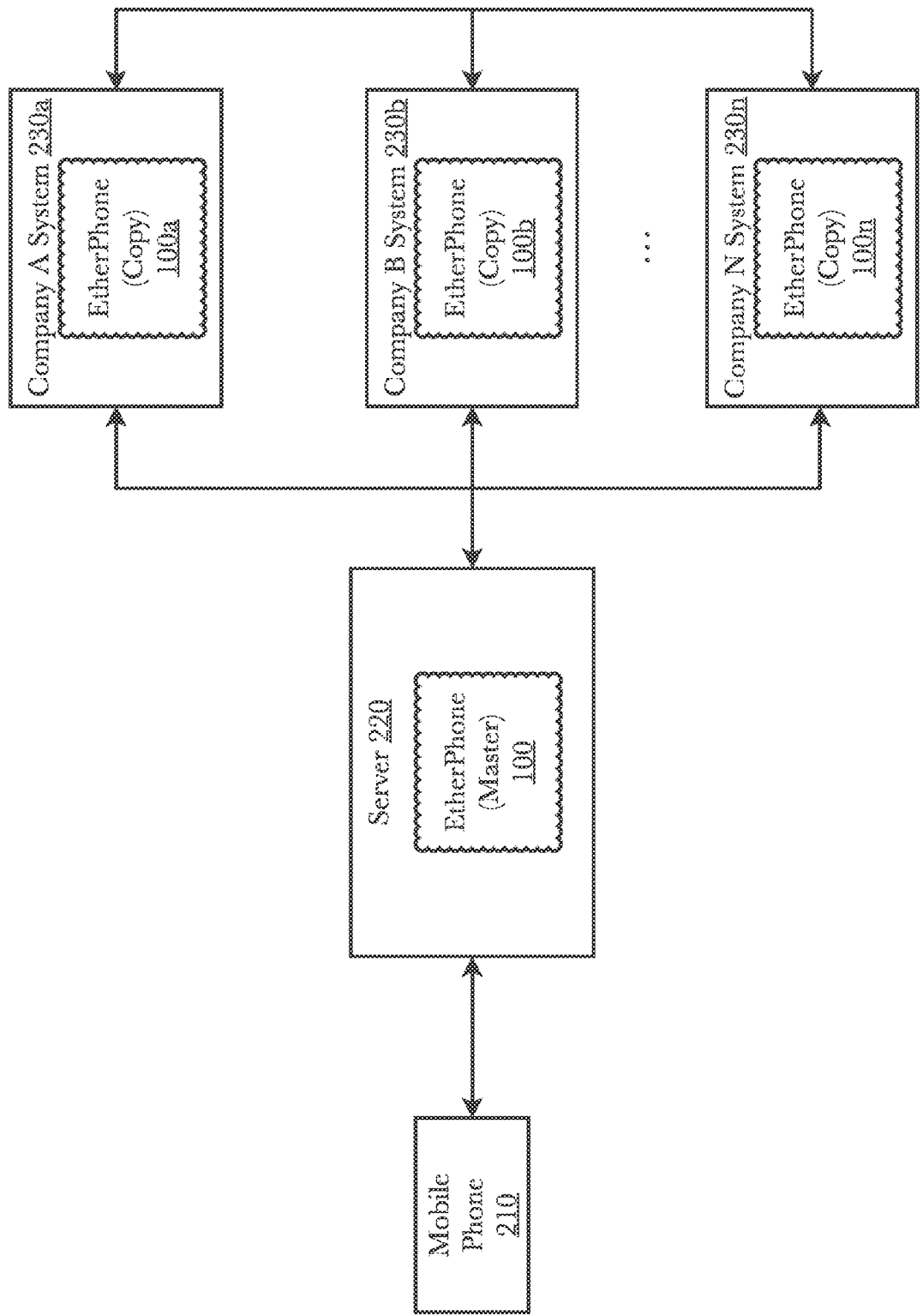
FIG. 3 is a block diagram illustrating an exemplary implementation of a virtual mobile computing device wherein a master version of the device resides on a server and copies of the device are passed among entities involved in a transaction.

FIG. 3 is a block diagram illustrating an exemplary implementation of a virtual mobile computing device wherein a master version of the device resides on a server and copies of the device are passed among entities involved in a transaction. In this embodiment, copies of the etherPhone 100*a-n* are distributed to multiple companies 230*a-n* involved a given transaction. Each company 230*a-n* may interact with its copy of the etherPhone 100*a-n* separately, with each copy 100*a-n* sending its information via its own master/copy manager 126 to the master/copy manager 126 of the master copy 100 for coordination. This allows for each company 230*a-n* involved in the transaction to interact with a copy of the etherPhone "offline" and have those interactions synchronized when connectivity is re-established. This embodiment is ideal for communications and transactions where one or more of the parties are intermittently available, or where the parties are available at different times (such as in different time zones).

Detailed Description of Exemplary Aspects

Figure 4:
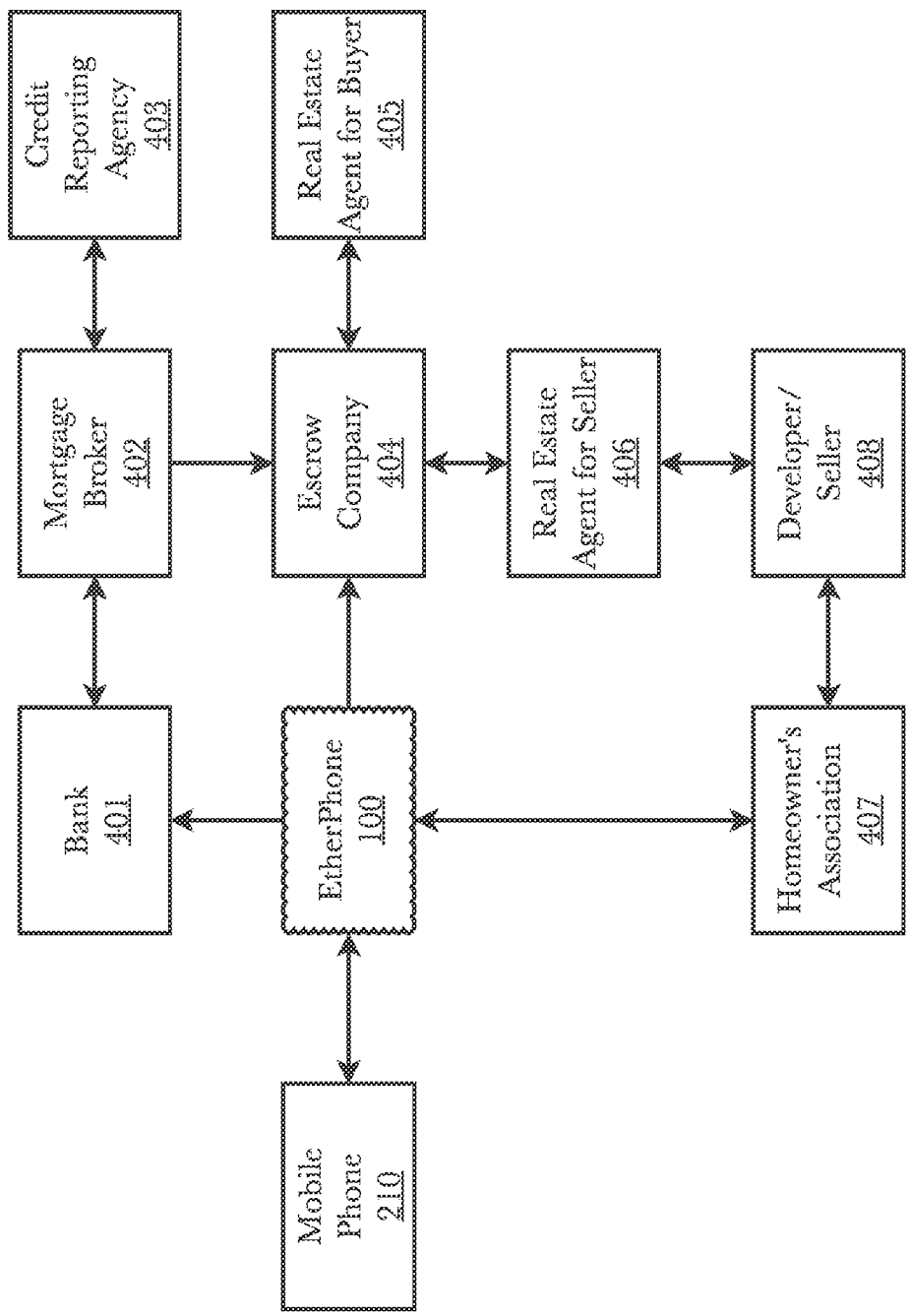
FIG. 4 is a flow diagram illustrating an exemplary use case of a virtual mobile computing device.

FIG. 4 is a flow diagram illustrating an exemplary use case of a virtual mobile computing device. This example shows the use of an etherPhone 100 as a central repository and distribution center for a real estate transaction involving the owner of the mobile phone 210. The parties involved include the buyer, who is also the owner of the mobile phone 210, the real estate agent for the buyer 405, the seller 408, who happens to be a real estate developer, the homeowner's association 407 established by the developer for management of the development after it passes from the control of the developer 408, the escrow company 404 handling the escrow for the transaction, the mortgage broker 402 who solicits loan offers from various banks, a bank 401, who issues the loan, and a credit reporting agency 403, who provides credit information about the buyer to the mortgage broker 402. In a typical real estate transaction of this type, each entity acts separately and manually coordinates with other parties involved in the transaction by phone or email, calling to arrange meetings and mailing or emailing documents for signature, with each party keeping its own documentation separately and providing documentation and status information only as required or requested by other parties. In a transaction implemented via etherPhone, the etherPhone acts as the central hub for coordinating communications, exchange of (or tracking of) documents, and tracking of the status of the transaction. In the implementation shown, a link, email address, or phone number to the etherPhone is sent with each communication such that a copy of every communication is sent to the etherPhone to be logged, forwarded to the next entity for action, or transmitted to other involved parties to notify them of the communication. So, all parties to the transaction have access to the current status of the transaction without having to manually call or email another entity to check on the status. For example, if the developer/seller 408 wants to know the current status of the buyer's mortgage loan, that information will be available in communications and/or transactions (e.g., approvals) logged in the etherPhone, which the developer/seller 408 may access via the etherPhone link (or which the developer/seller 408 may have received from the etherPhone via email distribution, etc.). A more detailed example of such messaging is shown in FIG. 5.

Figure 5:
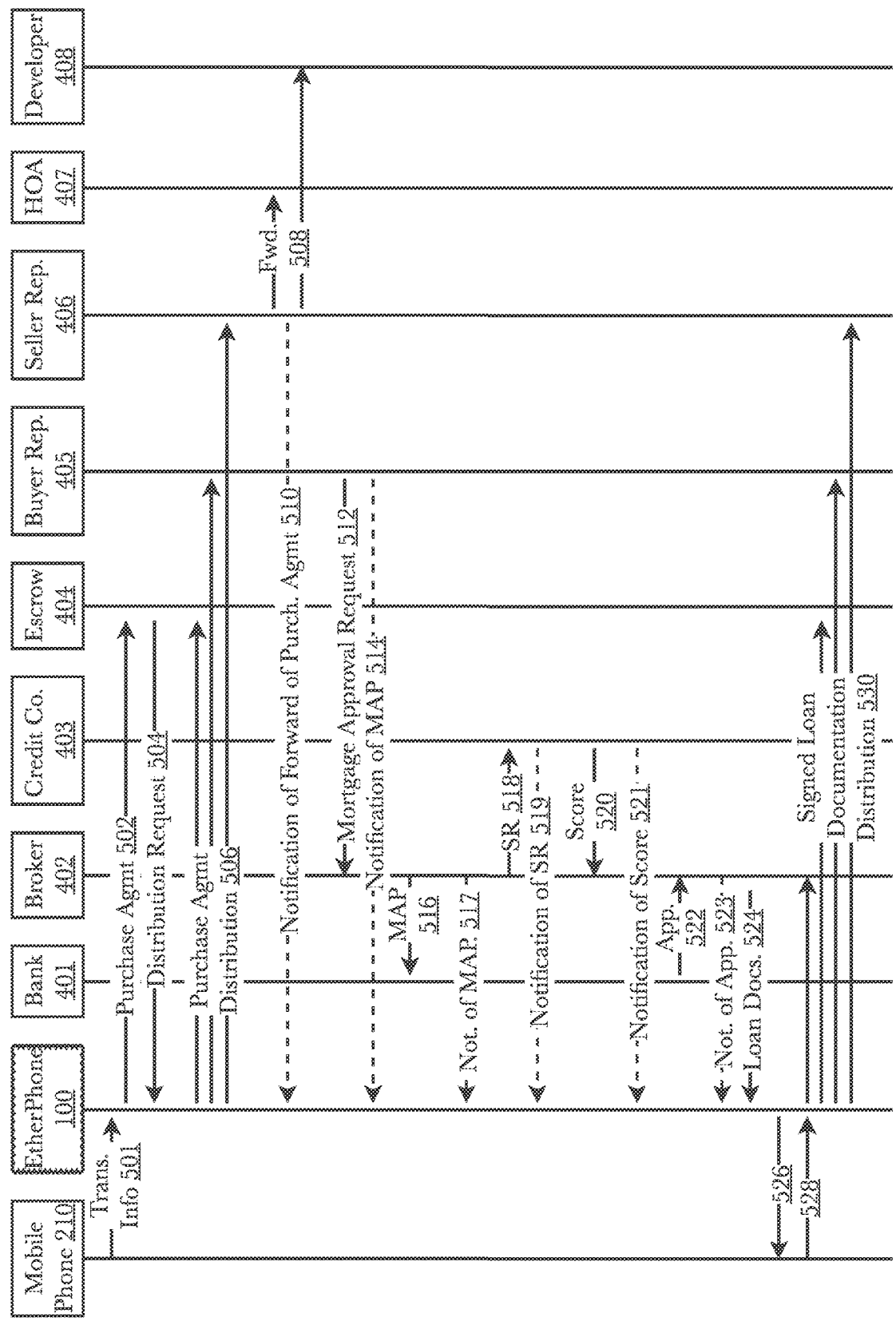
FIG. 5 is a messaging diagram illustrating messaging between entities in an exemplary use case of a virtual mobile computing device.

FIG. 5 is a messaging diagram illustrating messaging between entities in an exemplary use case of a virtual mobile computing device. This messaging diagram provides a more detailed example of messaging for a portion of the real estate transaction described in FIG. 4, in which the etherPhone acts as a central repository and distribution center for communications about the transaction. The real estate buyer (the owner of the mobile phone 210) sends transaction information 501 about the transaction (e.g., the owner's contact information, credentials, a signed copy of the real estate purchase agreement, etc.) to the etherPhone 100 using the mobile phone 210, the etherPhone forwards the purchase agreement 502 to the escrow company 404, which submits a distribution request 504 back to the etherPhone, specifying to whom the purchase agreement should be distributed, in this case to the mortgage broker 402, the buyer's agent 405, and the seller's agent 406. The etherPhone distributes the purchase agreement to the specified parties 506. The seller's agent manually forwards a copy 508 of the purchase agreement to the homeowner's association 407 and the developer 408, and an automated notification of the manual forwarding is sent to the etherPhone 510 for logging. While not shown here, the scope enforcer 125 of the etherPhone 100 could send warnings regarding the manual forwarding if such forwarding is out of scope (i.e., forwarding to those entities is restricted or prohibited).

Upon receipt of the purchase agreement, the buyer's agent 405 sends an email to the mortgage broker 402 asking for a mortgage to be approved by the bank 401, and an automated notification of the mortgage approval request 514 is sent to the etherPhone 510 for logging. The buyer's agent sends a mortgage approval request 512 to the mortgage broker 402, who forwards the request to the bank (mortgage lender) 401 for evaluation. Notifications of the mortgage approval requests 514, 516 are sent to the etherPhone 100 for logging. The mortgage broker 402 sends a credit score request 518 to the credit reporting agency 403, which returns a credit score 520 to the mortgage broker 402. Notifications of the credit score request and response 519, 521 are sent to the etherPhone. When the bank 401 sends notification of approval of the loan 522 to the mortgage broker, notification is sent 523 to the etherPhone 100. The mortgage broker 402 then sends loan documents to the owner for signature 524 via the etherPhone 100, which transmits the documents 526 to the mobile phone 210. When the owner signs the documents, the signed documents 528 are transmitted from the mobile phone 210 to the etherPhone 100, which then distributed the signed loan documentation to the mortgage broker 402, the escrow company 404, the buyer's agent 405, and the seller's agent 530. This example of a portion of a real estate transaction describes how the etherPhone may be configured to act as a central repository and distribution center for communications about the transaction, whereby any party to the transaction may query the etherPhone 100 for the current status of the transaction at any time, request copies of documents, request distribution of documents, request status updates from other parties, etc.

In another configuration, the etherPhone could be programmed with a process for completing the steps of the real estate transaction such that, as the etherPhone receives notifications of actions taken (e.g., approvals), it automatically contacts the next entity in the transaction to complete the next step of the process. For example, assuming that the etherPhone is so programmed and provided with the contact information of each entity in the process, upon receipt of the distribution request 504, the etherPhone may automatically send the mortgage approval request 512 to the mortgage broker 402 without it having to be manually requested by the buyer's agent 405, and the score 520 and loan approval 524 may be configured to be sent to the etherPhone 100 for distribution to the appropriate parties instead of having the etherPhone simply receive notifications of such actions. In this way, the etherPhone acts not only as a central repository and distribution center, but as an active facilitator of the transaction.

Figure 6:
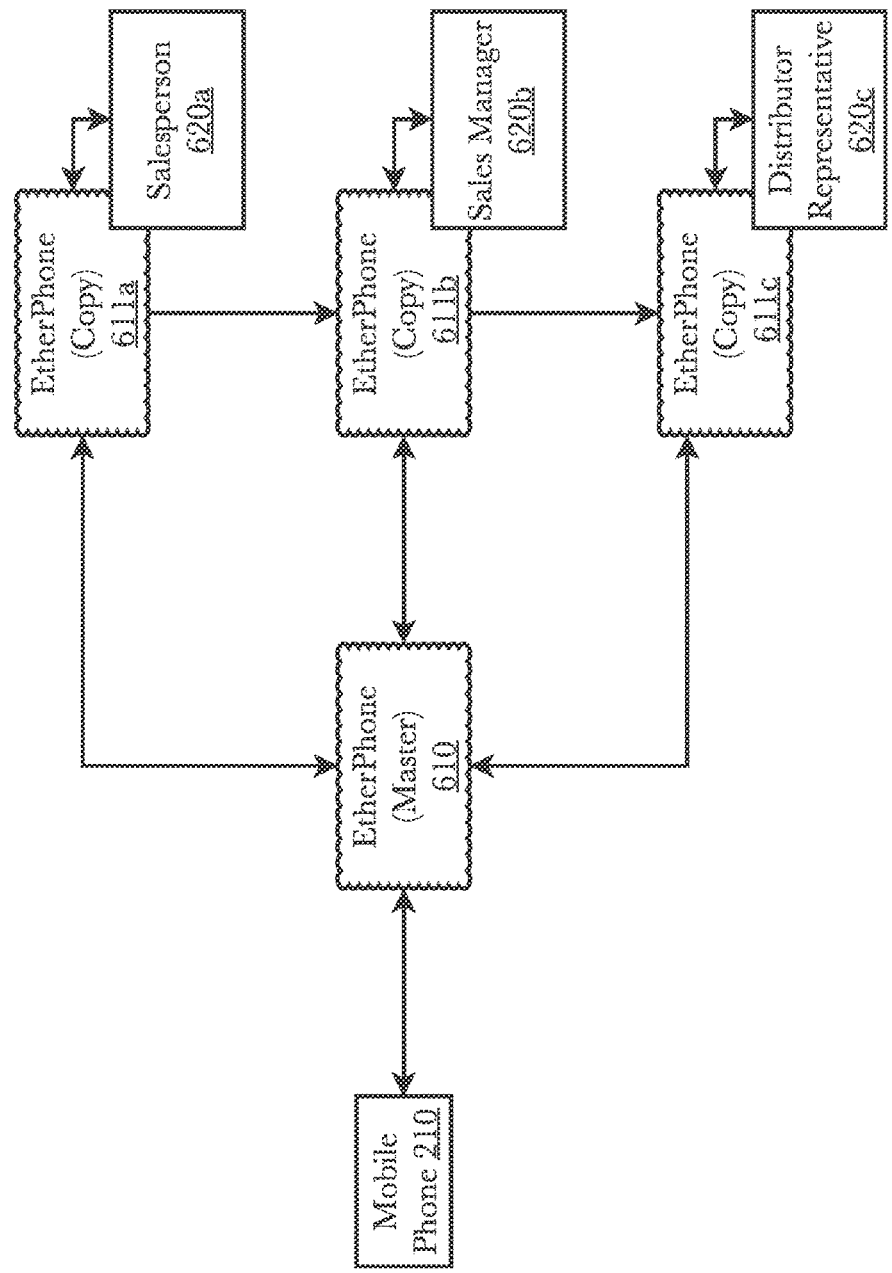
FIG. 6 is a flow diagram illustrating another exemplary use case of a virtual mobile computing device.

FIG. 6 is a flow diagram illustrating another exemplary use case of a virtual mobile computing device. This example shows the use of an etherPhone 100 to facilitate customer relationship management involving the owner of the mobile phone 210 as a customer. The parties involved include the owner of the mobile phone 210, a salesperson 620a at the company selling a product, a sales manager 620b at the same company, and a distributor representative 620c at a wholesale distributor of the product. In this example, the etherPhone is configured such that a master copy of the etherPhone 610 is kept on a cloud-based server while copies of the etherPhone 611a-c are transmitted to each of the people involved in a transaction 620a-c as needed for each person to interact with the eitherPhone to complete his or her portion of the transaction. In this example, the owner of the mobile phone 210 is a customer whose customer journey starts with an purchase request via email to the company about a product. The email is sent from the mobile phone 210 through the etherPhone 610 to the salesperson 620a. The email contains a transaction identifier which can be used by the etherPhone to log all communications about that transaction. A containerized copy of the etherPhone 611a is transmitted along with the email which, assuming permission is granted by the salesperson 620a, is installed on the salesperson's computer. The containerized copy of the etherPhone 611a is configured to allow the salesperson 620a to communicate to the owner of the mobile phone 210 via email, text, phone, or video conferencing by selecting appropriate options on the etherPhone's 611a user interface. Further, the salesperson 620a can send emails, texts, and make phone and video conference calls through the etherPhone's interface to other persons, which emails, texts, and phone of video conference calls will automatically contain the transaction identifier and be logged by the etherPhone 611a as part of the transaction.

Here, the purchase request is for an amount that is larger than the salesperson 620a is authorized to approve, so the salesperson sends an approval request via the interface of the etherPhone copy 611a to the sales manager 620b which automatically sends a second copy of the etherPhone 611b for installation on the sales manager's 620b computer. The sales manager 620b, using the second copy of the etherPhone 611b, queries a distributor representative 620c to see if a sufficient quantity of the product is available for sale, the query likewise being accompanied by a third copy of the etherPhone 611c, which the distributor representative 620c can use to answer the query. All three copies of the etherPhone 611a-c synchronize their information with the master copy 610, which provides notification to the mobile phone 210. A more detailed example of such messaging is shown in FIG. 7.

In some configurations, the containerized copies of the etherPhone 611a-c may be granted access to the operating system or applications of the computers on which they are installed, allowing the etherPhone copies 611a-c to intercept emails, texts, and phone or video conference calls from applications on the computers without the computer users (in this example, the salesperson 620a, sales manager 620b, distributor representative 620c) having to use the interface of the etherPhone. These configurations make the etherPhone facilitation of transactions more seamless for users, but may require additional approvals for installation, especially where the etherPhone is configured to access operating system resources.

Figure 7:
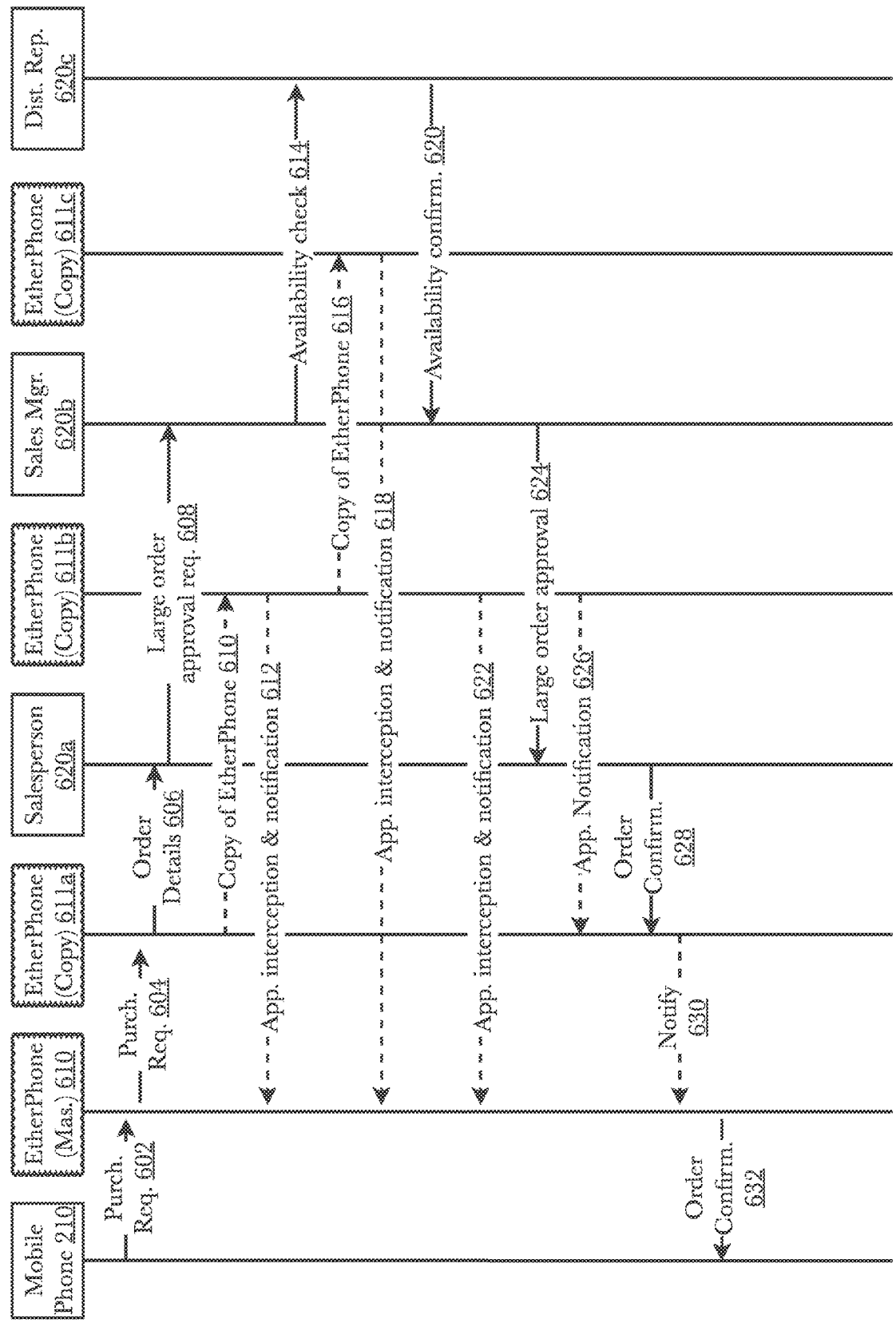
FIG. 7 is a messaging diagram illustrating messaging between entities in another exemplary use case of a virtual mobile computing device.

FIG. 7 is a messaging diagram illustrating messaging between entities in another exemplary use case of a virtual mobile computing device. This messaging diagram provides a more detailed example of messaging for a portion of the real estate transaction described in FIG. 6, in which the containerized copies of an etherPhone are transmitted between parties to a transaction to facilitate the transaction and communications associated with the transaction.

In this example, the owner of the mobile phone 210 is a customer whose customer journey starts with a purchase request via email 602 to the company about a product. The purchase request 602 is sent from the mobile phone 210 and incorporated into the master etherPhone 610 and a purchase request 604 is incorporated into a copy of the etherPhone 611a. Order details 606 are to the salesperson 620a, the order details 606 comprising the purchase request, a transaction identifier, and a containerized first copy of the etherPhone 611a. The transaction identifier is used by the etherPhone to log all communications about that transaction. Assuming that permission is granted by the salesperson 620a, the first copy of the etherPhone 611a is installed on the salesperson's computer. The containerized copy of the etherPhone 611a is configured to allow the salesperson 620a to communicate to the owner of the mobile phone 210 via email, text, phone, or video conferencing by selecting appropriate options on the etherPhone's 611a user interface. Further, the salesperson 620a can send emails, texts, and make phone and video conference calls through the etherPhone's interface to other persons, which emails, texts, and phone of video conference calls will automatically contain the transaction identifier and be logged by the etherPhone 611a as part of the transaction.

Here, as the purchase request is for an amount that is larger than the salesperson 620a is authorized to approve, the salesperson sends a large order approval request 608 via the interface of the etherPhone copy 611a to the sales manager 620b which automatically sends 610 a containerized second copy of the etherPhone 611b for installation on the sales manager's 620b computer. The sales manager 620b, using the second copy of the etherPhone 611b, queries a distributor representative 620c to see if a sufficient quantity of the product is available for sale 614, and the second copy of the etherPhone 611b intercepts the large order approval request and sends a notification 612 back to the master etherPhone 610. The availability check query 614 to the distributor representative is likewise being accompanied by creating, at 616, a containerized third copy of the etherPhone 611c, which the distributor representative 620c can use to confirm availability 620. The availability check 614 and confirmation 620 are both intercepted by their respective copies of the etherPhone 611b, 611c and notifications are sent back 618, 622 to the master etherPhone 610. When the sales manager 620b approves the large order purchase request 624, the second copy of the etherPhone 611b sends notification 626 of the approval to the first copy 611a (which subsequently sends the notification to the master etherPhone 610). The salesperson 620a confirms the order 628, and a notification 630 is sent from the first copy 611a to the master etherPhone 610, which forwards the order confirmation 632 to the mobile phone 210. In this way, all three copies of the etherPhone 611a-c synchronize their information with the master copy 610, which provides notification to the mobile phone 210, and a complete record of the transaction (purchase request, approval requests, approvals, queries, and confirmations) is kept.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
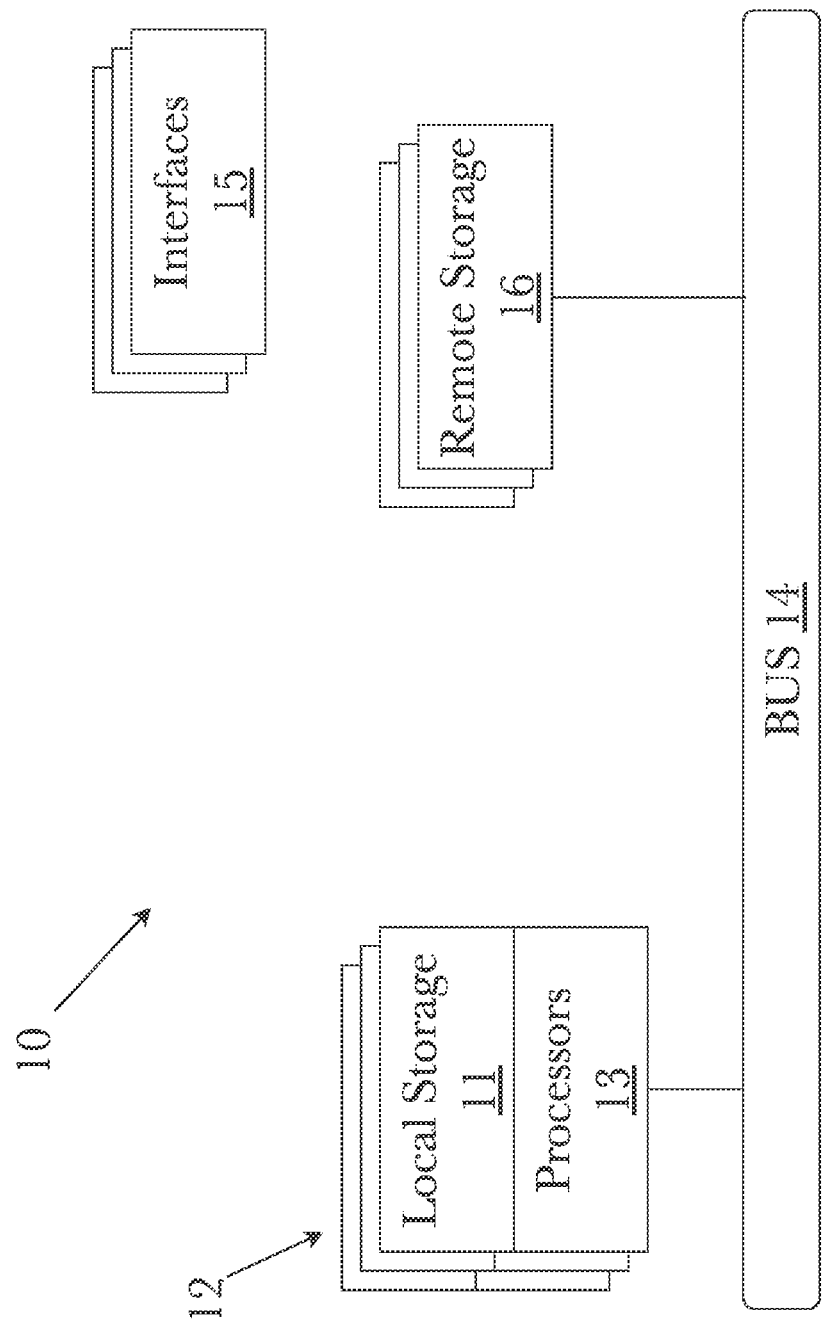
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON' or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT', PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
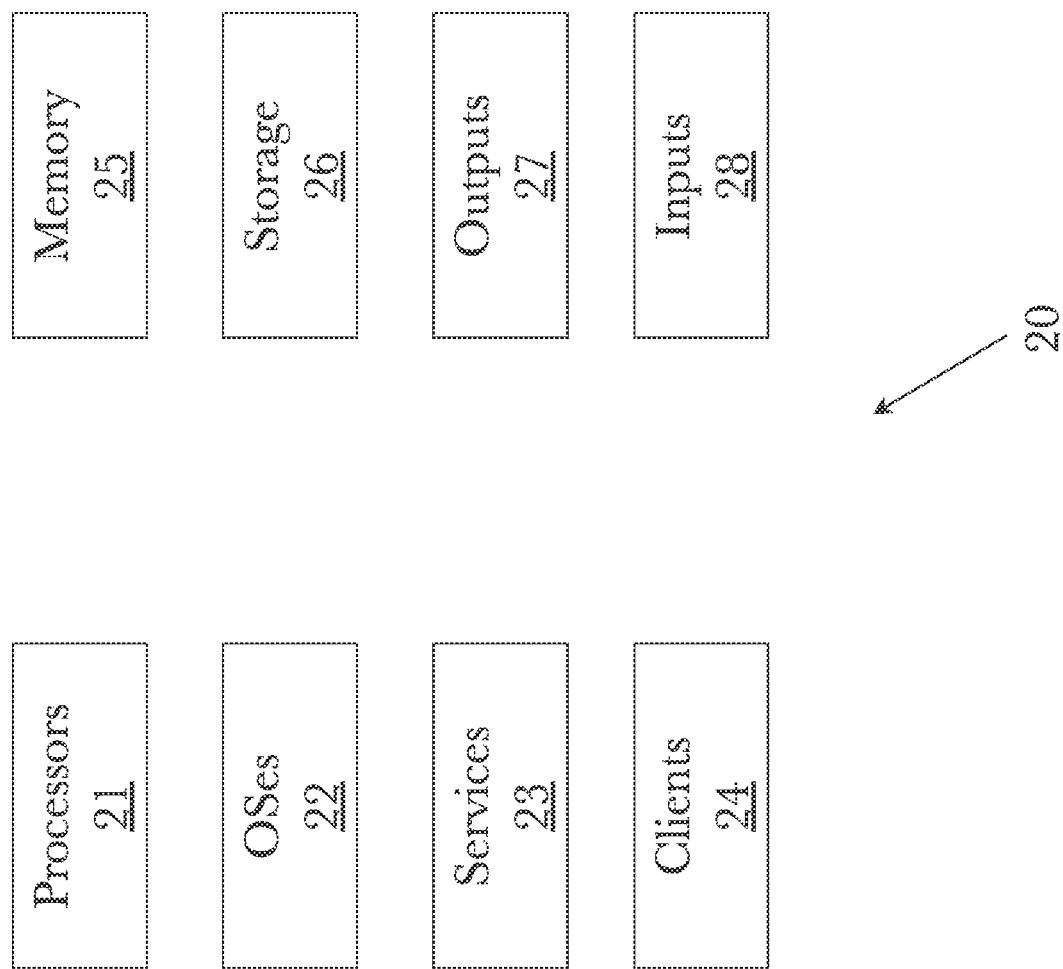
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS' operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
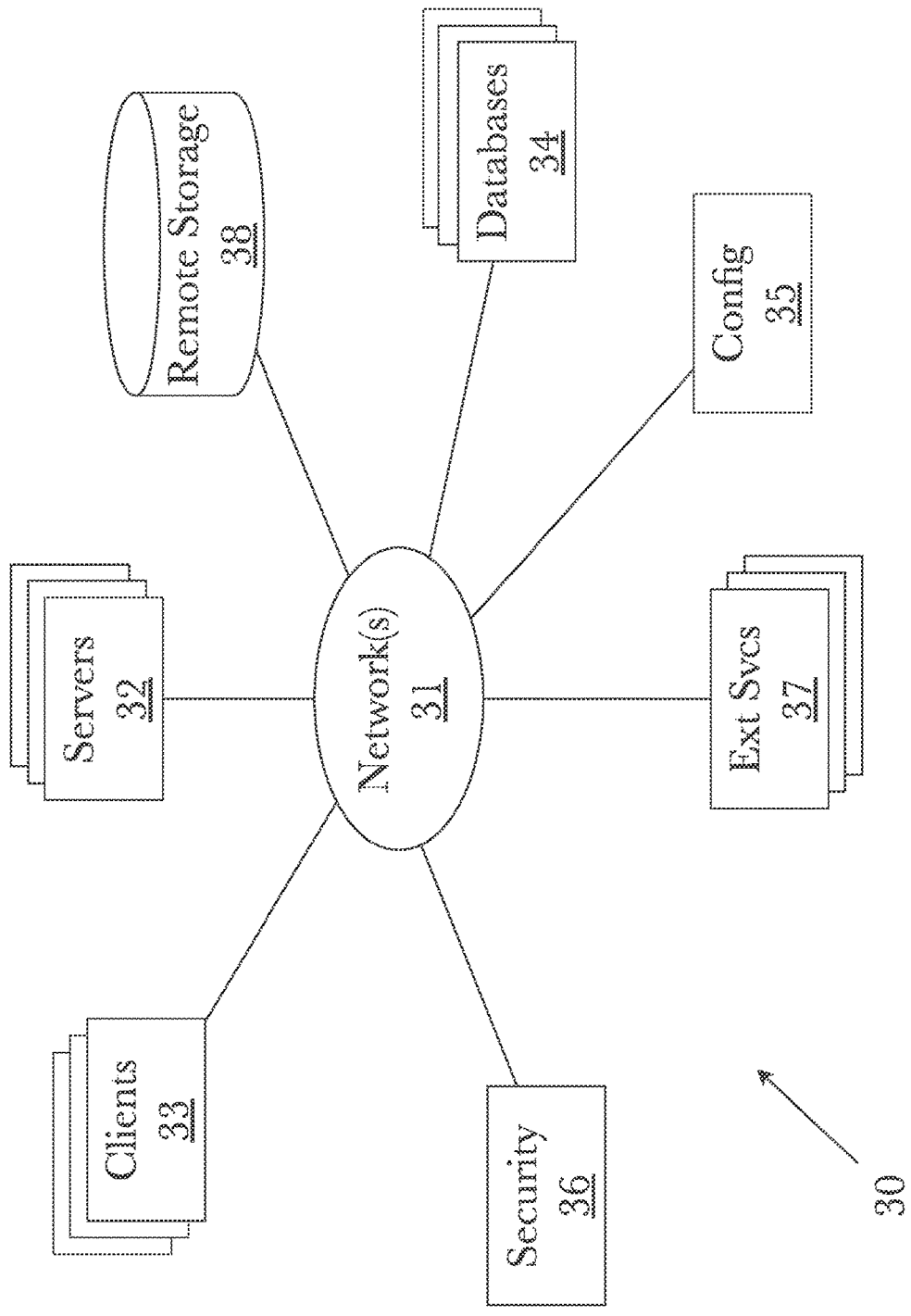
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
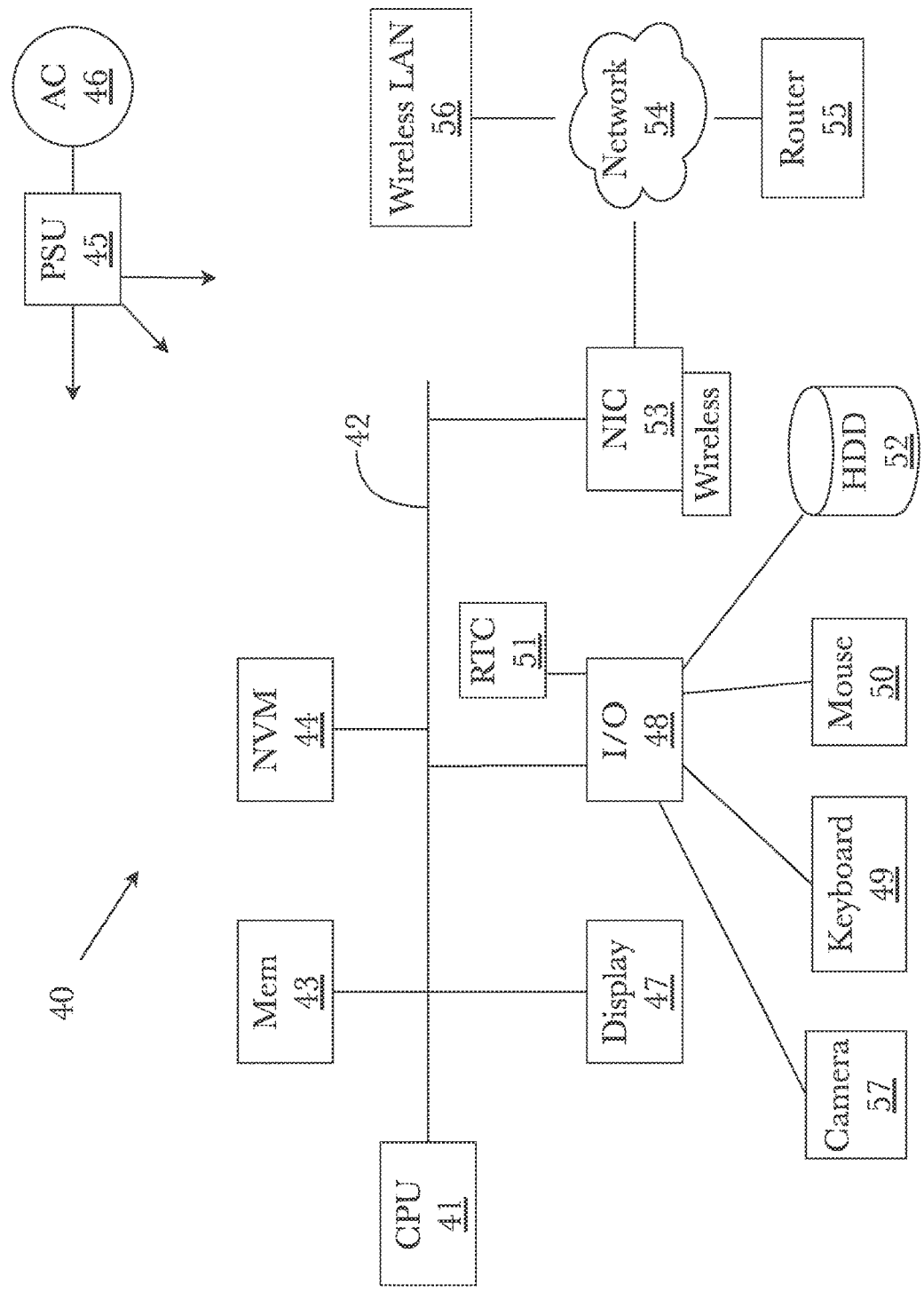
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A proxy communication system for maintaining persistence and state of an intermittently available communication device comprising:
a processor;
a network-connected master proxy communicator for bi-directional synchronization of persistence and state for a plurality of transactions associated with a plurality of copy proxy communicators comprising a first plurality of programming instructions stored in the memory and operating on the processor of a server, the first plurality of programming instructions when executed by the processor cause the processor to:
associate the master proxy communicator to a first communication device of a plurality of communication devices, wherein the master proxy communicator emulates the intermittently available communication device;
create the plurality of copy proxy communicators, the plurality of copy proxy communicators being copies of the master proxy communicator;
associate and distribute each copy proxy communicator to another distinct communication device of the plurality of communication devices, wherein each distinct communication device is associated with a first transaction;
transmit, at the master proxy communicator, a respective portion of the first transaction to each of the plurality of copy proxy communicators, wherein the first transaction has a transaction identifier and each portion of the first transaction transmitted to the plurality of copy proxy communicators is associated with the transaction identifier, has a state associated with the first transaction, and is operable to comprise a communication;
as the first transaction is being processed by the plurality of copy proxy communicators:
receive, at the master proxy communicator, a communication associated with the first transaction from each copy proxy communicator of the plurality of copy proxy communicators, each communication comprising the transaction identifier of the first transaction, change in the state associated with the first transaction, and which copy proxy communicators of the plurality of copy proxy communicators is a source and a destination of the communication, via the master proxy communicator;
receive, at the master proxy communicator, one or more records from each copy proxy communicator, the one or more records associated to the master proxy communicator and the first transaction;
store, at the master proxy communicator, each received communication and the one or more records in a journey log;
determine which copy proxy communicators of the plurality of copy proxy communicators are needed to further process the transaction; and
send, to at least a portion of the plurality copy proxy communicators, the state of the first transaction based on the determination, wherein the sending further comprises:
iteratively:
receive, at the master proxy communicator, a notification of a change in a state of the first transaction from at least one copy proxy communicator of the at least a portion of the plurality copy proxy communicators;
   record the change in state of the first transaction in the journey log database;
   send, by the master proxy communicator, the change in state of the first transaction to at least a second portion of the plurality copy proxy communicators needed to further process the transaction; and
   send, to at least the second portion of the plurality copy proxy communicators, one or more records from the master proxy communicator, the records associated with the first transaction;
  one or more of the communications occur while the first communication device is offline.

2. The proxy communication system of claim 1, wherein the change in the state is a next step in the first transaction.

3. The proxy communication system of claim 2, wherein the change in state is a change in location of the first communication device.

4. The proxy communication system of claim 2, wherein the change in state is a notification comprising a request for an approval of the first transaction.

5. The proxy communication system of claim 1, wherein the master proxy communicator adds a new copy proxy communicator to the plurality of copy proxy communicators, the new copy proxy communicator operating on an additional communication device of the plurality of communication devices.

6. The proxy communication system of claim 1, wherein a first copy proxy communicator comprises contact information for an owner of an associated communication device.

7. The proxy communication system of claim 6, wherein the change in state causes the contact information for the owner of the associated communication device to be sent, by the first copy proxy communicator, to the master proxy communicator.

8. The proxy communication system of claim 6, wherein at least one or more records associated to the first copy proxy communicator are sent to a customer relationship management system by the master proxy communicator.

9. The proxy communication system of claim 8, wherein the first transaction is tracked by the master proxy communicator and the tracking is sent to at least a portion of the plurality of copy proxy communicators.

10. A computer-implemented method for maintaining persistence and state of an intermittently available communication device, the method comprising the steps of:
   associating the master proxy communicator to a first communication device of a plurality of communication devices, wherein the master proxy communicator emulates the intermittently available communication device;
   creating, by the master proxy communicator, a plurality of copy proxy communicators, the plurality of copy proxy communicators being copies of the master proxy communicator;
   associating and distributing, by the master proxy communicator, each copy proxy communicator to another distinct communication device of the plurality of communication devices, wherein each distinct communication device is associated with a first transaction;
   transmitting, at the master proxy communicator, a respective portion of the first transaction to each of the plurality of copy proxy communicators, wherein the first transaction has a transaction identifier and each portion of the first transaction transmitted to the plurality of copy proxy communicators is associated with the transaction identifier, has a state associated with the first transaction, and is operable to comprise a communication;
   as the first transaction is being processed by the plurality of copy proxy communicators:
     receiving, at the master proxy communicator, a communication associated with the first transaction from each copy proxy communicator of the plurality of copy proxy communicators, each communication comprising the transaction identifier of the first transaction, change in the state associated with the first transaction, and which copy proxy communicators of the plurality of copy proxy communicators is a source and a destination of the communication, via the master proxy communicator;
     receiving one or more records from each copy proxy communicator, the one or more records associated to the master proxy communicator and the first transaction;
     storing, at the master proxy communicator, each received communication and the one or more records in a journey log;
     determining which copy proxy communicators of the plurality of copy proxy communicators are needed to further process the transaction; and
     sending, to at least a portion of the plurality copy proxy communicators, the state of the first transaction based on the determination, wherein the sending further comprises:
       iteratively:
         receiving, at the master proxy communicator, a notification of a change in a state of the first transaction from at least one copy proxy communicator of the at least a portion of the plurality copy proxy communicators;
         recording the change in state of the first transaction in the journey log database;
         sending, by the master proxy communicator, the change in state of the first transaction to at least a second portion of the plurality copy proxy communicators needed to further process the transaction; and
         sending, to at least the second portion of the plurality copy proxy communicators one or more records from the master proxy communicator, the records associated with the first transaction;
  one or more of the communications occur while the first communication device is offline.

11. The method of claim 10, wherein the change in state is a next step in the first transaction.

12. The method of claim 11, wherein the change in state is a change in location of the first communication device.

13. The method of claim 11, wherein the change in state is a notification comprising a request for an approval of the first transaction.

14. The method of claim 10, wherein the master proxy communicator adds a new copy proxy communicator to the plurality of copy proxy communicators, the new copy proxy communicator operating on an additional communication device of the plurality of communication devices.

15. The method of claim 10, wherein a first copy proxy communicator comprises contact information for an owner of an associated communication device.

16. The method of claim 15, further comprising the step of receiving, at the master proxy communicator the contact information for the owner of the first copy proxy communicator based on the change in state.

17. The method of claim 10, wherein at least one or more records associated to the first copy proxy communicator are sent, by the master proxy communicator, to a customer relationship management system.

18. The method of claim 17, wherein the first transaction is tracked by the master proxy communicator and the tracking is sent to at least a portion of the plurality of copy proxy communicators.

* * * * *